(12) United States Patent
Honda

(10) Patent No.: US 7,299,115 B2
(45) Date of Patent: Nov. 20, 2007

(54) ELECTRICALLY-DRIVEN VEHICLE

(75) Inventor: Satoshi Honda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 493 days.

(21) Appl. No.: 11/029,700

(22) Filed: Jan. 6, 2005

(65) Prior Publication Data

US 2005/0177285 A1 Aug. 11, 2005

(30) Foreign Application Priority Data

Jan. 8, 2004 (JP) ............................. 2004-002907

(51) Int. Cl.
  *G06F 19/00* (2006.01)
(52) U.S. Cl. ..................... 701/22; 180/65.1; 180/220
(58) Field of Classification Search .............. 701/22; 280/87.1, 63; 180/65.1, 65.8, 218–220
  See application file for complete search history.

(56) References Cited

U.S. PATENT DOCUMENTS

| | | | |
|---|---|---|---|
| 5,226,501 A | * | 7/1993 | Takata .................. 180/206 |
| 5,474,148 A | * | 12/1995 | Takata .................. 180/206 |
| 5,730,243 A | * | 3/1998 | Koike et al. ............. 180/220 |
| 5,924,511 A | * | 7/1999 | Takata .................. 180/205 |

FOREIGN PATENT DOCUMENTS

| | | |
|---|---|---|
| EA | 0072613 A2 | 2/1983 |
| EA | 0 728 613 A3 | 8/1996 |
| EA | 1 129-934 A3 | 9/2001 |
| EP | 0 869 053 A3 | 10/1998 |
| JP | 04-358988 A | 12/1992 |
| JP | 2003-95182 A | 4/2003 |

\* cited by examiner

*Primary Examiner*—Gary Chin
(74) *Attorney, Agent, or Firm*—Birch, Stewart, Kolasch & Birch, LLP

(57) ABSTRACT

To provide an electrically-driven vehicle which does not impede the usual traveling even when a push-walk function is used. A motor is provided for driving a drive wheel with a battery supplying electric power to the motor. A throttle is provided for adjusting a vehicle speed and a battery control unit controls the motor based on an output of the throttle. The electrically-driven vehicle further includes a push-walk switch operated by a rider for selecting the push-walk traveling and, at the same time, the battery control unit also performs the detection of a vehicle state. The battery control unit performs the control of the push-walk traveling when the battery control unit receives the instruction of the push-walk switch via a rider and a vehicle state satisfies a preset condition.

20 Claims, 14 Drawing Sheets

ELECTRICALLY-DRIVEN VEHICLE

CROSS-REFERENCE TO RELATED APPLICATIONS

The present application is related to Japanese Patent Application No. 2004-002907 filed on Jan. 8, 2004 the entire contents of which are hereby incorporated by reference.

BACKGROUND OF THE INVENTION

1. Field of the Invention

The present invention relates to an electrically-driven vehicle having a push-walk function.

2. Description of Background Art

An electrically-drive-assisted bicycle is disclosed in JP-A-2003-95182 which uses a resultant force of manpower and an assist power as a driving force. The electrically-drive-assisted bicycle is provided with a push-walk function which allows the bicycle to travel at a speed which is slower than a usual vehicle speed and is substantially equal to a speed that a man walks. The application of the push-walk function to an electrically-driven vehicle such as a scooter is hereinafter discussed. Here, the electrically-drive-assisted bicycle adopts the structure in which a one-way clutch or the like is interposed between a pedal crank and a drive shaft or between a motor and the drive shaft. Thus, even when the push-walk function is driven during usual traveling, the adjustment is configured to be performed between the speed of the pedal traveling using manpower and the speed of the push-walk function.

However, since the electrically-operated scooter or the like uses the power of the electrically-operated motor as the main driving force, when the push-walk function is driven during usual traveling, the driving force of the electrically-operated motor is changed.

SUMMARY AND OBJECTS OF THE INVENTION

The present invention has been made to solve the above-mentioned problem. It is an object of the present invention to provide an electrically-driven vehicle which allows the push walk only when a given condition is satisfied.

The present invention is directed to an electrically-driven vehicle which includes an electrically-driven motor for driving a drive wheel. A battery is provided for supplying electric power to the electrically-driven motor. A throttle is provided for adjusting the vehicle speed. A control part is provided for controlling the electrically-driven motor based on an output of the throttle. The electrically-driven vehicle includes push-walk switch means for allowing a rider to instruct push-walk traveling and vehicle state detection means for detecting a state of a vehicle. The control part controls the electrically-driven motor in the push-walk traveling only when the control part receives an instruction from the push-walk switch means and when the vehicle state which is detected by the vehicle state detection means satisfies a preset condition.

The control part is configured to receive the instruction from the push-walk switch means and to control the electrically-operated motor in the push walk traveling when the vehicle state satisfies the preset condition at the time of receiving the instruction. Accordingly, even when the push-walk switch means is manipulated by a rider when the vehicle state does not satisfy the preset condition, the control part maintains the usual traveling as it is.

The present invention provides the control part that does not perform a control based on the output of the throttle during the exercise of the push-walk traveling.

Since the control part is configured not to perform the control based on the output of the throttle during the exercise of the push-walk traveling, the control of the push-walk traveling can be continuously performed even when the rider opens the throttle during the push-walk traveling.

The present invention provides that the preset condition is a condition wherein an opening of the throttle is not larger than a fixed value.

Since the control part is configured not to perform the push-walk traveling unless the opening of the throttle is not larger than the fixed value, even when the push-walk switch means is manipulated by the rider in a state that the rider performs the traveling by opening the throttle, the control part can maintain the usual traveling as it is.

The present invention provides that the preset condition is a condition wherein the vehicle speed is not larger than a fixed value.

Since the control part is configured not to perform the push-walk traveling unless the vehicle speed is not larger than a fixed value, even when the push-walk switch means is manipulated by the rider in a state when the vehicle speed exceeds the fixed value, the control part can maintain the usual traveling as it is.

The present invention provides the control part that does not receive the instruction from the push-walk switch means when the vehicle speed exceeds the fixed value.

The control part is configured not to receive the instruction from the push-walk switch means when the vehicle speed exceeds the fixed value. Accordingly, when the vehicle speed exceeds the fixed value, that is, in case that the vehicle speed exceeds the fixed value, even when the push-walk switch is manipulated by the rider during the usual traveling, the control part is capable of preventing the occurrence of the lowering of the speed of the vehicle.

The electrically-driven vehicle is configured to allow the push walk when the push-walk switch means is manipulated by the rider during a period in which the vehicle state assumes the preset state. Accordingly, even when the push-walk switch means is manipulated during the period in which the vehicle state does not assume the preset state, for example, during the usual traveling, it is possible to obtain an advantageous effect wherein the usual traveling can be continued as it is without shifting the state to the push-walk state.

The electrically-driven vehicle is configured in another embodiment not to perform the control based on the throttle manipulation in the state that the push-walk traveling is performed. Accordingly, when the electrically-driven vehicle is in the push-walk traveling state, even when the throttle manipulation is performed by the rider or the like, it is possible to have an advantageous effect wherein the push-walk manipulation can be maintained as it is without shifting the traveling control to the traveling control based on the throttle manipulation (usual traveling control).

The electrically-driven vehicle is configured in another embodiment to perform the control of push-walk traveling in response to the manipulation of the push-walk switch means which is performed by the rider when the opening of the throttle is in the state of being not more than a given value. Accordingly, it is possible to obtain an advantageous effect that the electrically-driven vehicle can be controlled not to perform the push-walk control even when the push-walk switch means is manipulated by the rider when the opening of the throttle is not less than the given value.

The electrically-driven vehicle is configured in another embodiment to perform the control of push-walk traveling when the manipulation of push-walk switch means is performed by the rider in the state wherein the vehicle speed is not more than the given value. Accordingly, even when the manipulation of the push-walk switch means is performed by the rider when the vehicle speed is not smaller than the given value, for example, in the usual traveling state, it is possible to have an advantageous effect that the usual traveling state can be maintained as it is without shifting the traveling state of the electrically-driven vehicle to the push-walk traveling state.

The electrically-driven vehicle is configured in another embodiment not to receive the instruction from the push-walk switch means when the vehicle speed exceeds the given value. Accordingly, even when the manipulation of the push-walk switch means is performed by the rider when the vehicle speed exceeds the given value, for example, during the usual traveling, the lowering of the speed of the vehicle is not generated. Thus, it is possible to obtain an advantageous effect that a more favorable traveling feeling can be maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
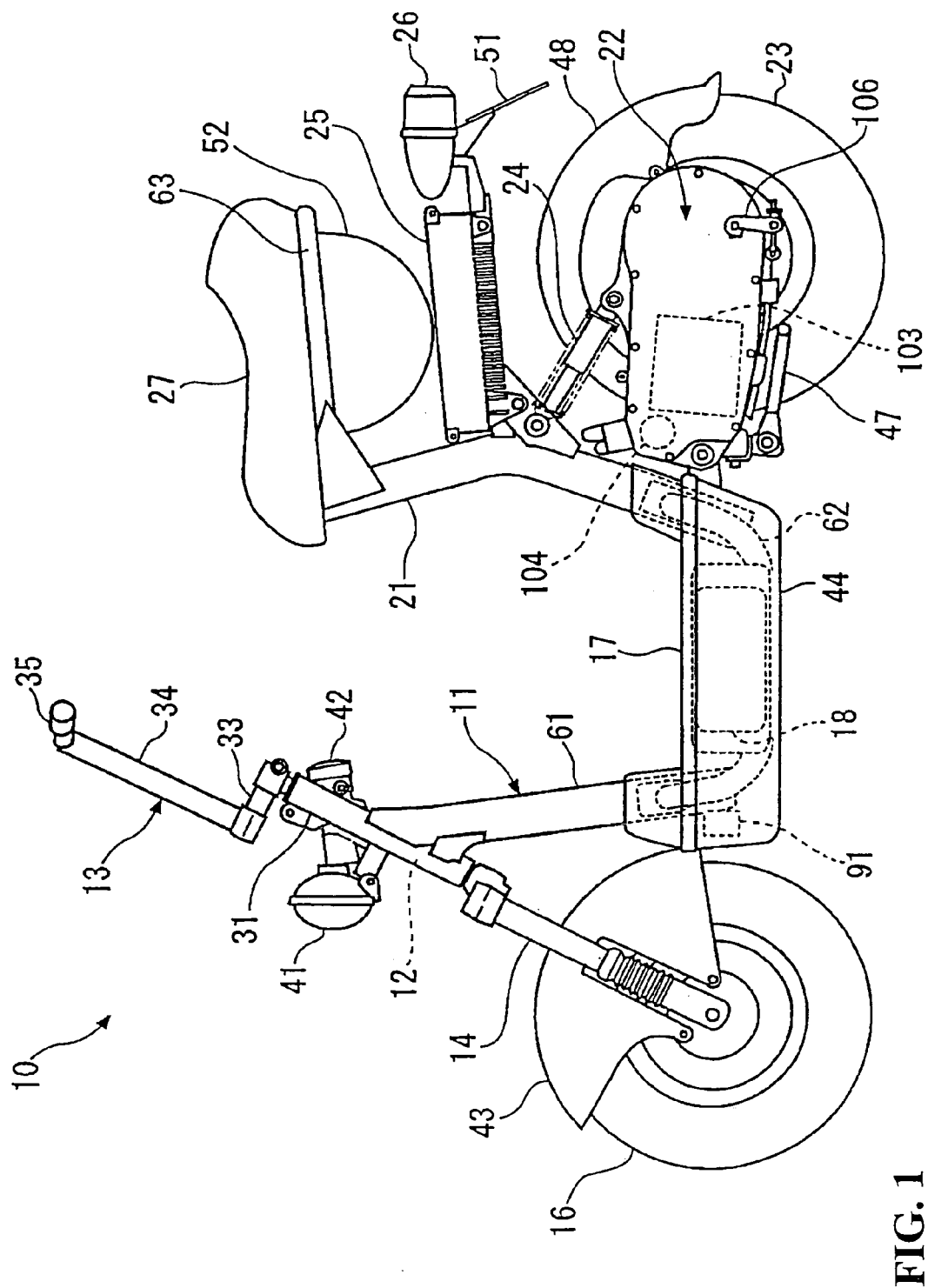
FIG. 1 is a side view of an electrically-driven vehicle according to one embodiment of the present invention.

Hereinafter, an electrically-driven vehicle according to one embodiment of the present invention is explained in conjunction with the drawings. FIG. 1 is a side view of the electrically-driven vehicle according to one embodiment of the present invention, wherein the electrically-driven vehicle 10 includes a handle shaft 12 which is rotatably mounted on a front portion of a vehicle body frame 11 with a handle 13 mounted on an upper portion of the handle shaft 12. A front fork 14 is mounted on a lower portion of the handle shaft 14 with a front wheel 16 mounted on a lower end of the front fork 14. A floor step 17 is mounted on a center portion of the vehicle body frame 11 with batteries 18, 18 (only symbol 18 indicative of the front-side battery being shown) arranged below the floor step 17. A swing-type power unit 22 is vertically swingably mounted on a lower portion of a seat post 21 which constitutes a rear portion of the vehicle body frame 11. A rear wheel 23 functions as a wheel which is mounted on a rear portion of the power unit 22 with a rear shock absorber 24 extending between an upper portion of the power unit 22 and the seat post 21 side. A battery control unit 25 functions as a voltage conversion part which is mounted on an intermediate portion of the seat post 21 with a tail lamp 26 arranged behind the battery control unit 25. A seat 27 is mounted on an upper end portion of the seat post 21.

The vehicle body frame 11 includes a head pipe 31 which rotatably supports the handle shaft 12 on a front portion thereof.

The handle 13 includes an arm 33 which is mounted on an upper end of the handle shaft 12, a handle support member 34 which extends upwardly from the arm 33, and a handle bar 35 which is mounted on an upper end of the handle support member 34. With the provision of the handle support member 34, it is possible to arrange the head pipe 31 at a low position. Thus, the vehicle body frame 11 can be miniaturized whereby the weight of the vehicle body frame 11 can be reduced.

The battery 18 is of a type in which a plurality of columnar battery cells are wrapped by a resin-made shrink pack (a packaging material which wraps the battery cells by being shrunken with heat).

The battery control unit 25 includes a charger which allows an electric current to flow into the battery 18 after rectifying a commercial power source to a direct current and by lowering the direct current to a given voltage, and a DC-DC converter which converts a battery voltage which is set to a high voltage for driving a motor into a low voltage for the electrical equipment such as the tail lamp.

More specifically, the battery control unit 25 is integrally constituted of the charger and the DC-DC converter. Although the battery control unit 25 is explained as an integral type including the charger and the DC-DC converter in this embodiment hereinafter, it is needless to say that the charger and the DC-DC converter may be constituted separately. For example, the charger may be arranged close to the battery 18 and the DC-DC converter may be arranged close to the electrical equipment such as the tail lamp or the like.

A head lamp 41 and a main switch 42 are mounted on a front portion of the vehicle body frame 11 with a front fender 43 which covers a position above the front wheel 16. An under cover 44 is provided that covers a position below the floor step 17 with a side stand 47 and a rear fender 48 which covers a position above the rear wheel 23. A license plate 51 is mounted on a lower portion of the tail lamp 26 with a helmet 52 which is accommodated below the seat 27.

Figure 2:
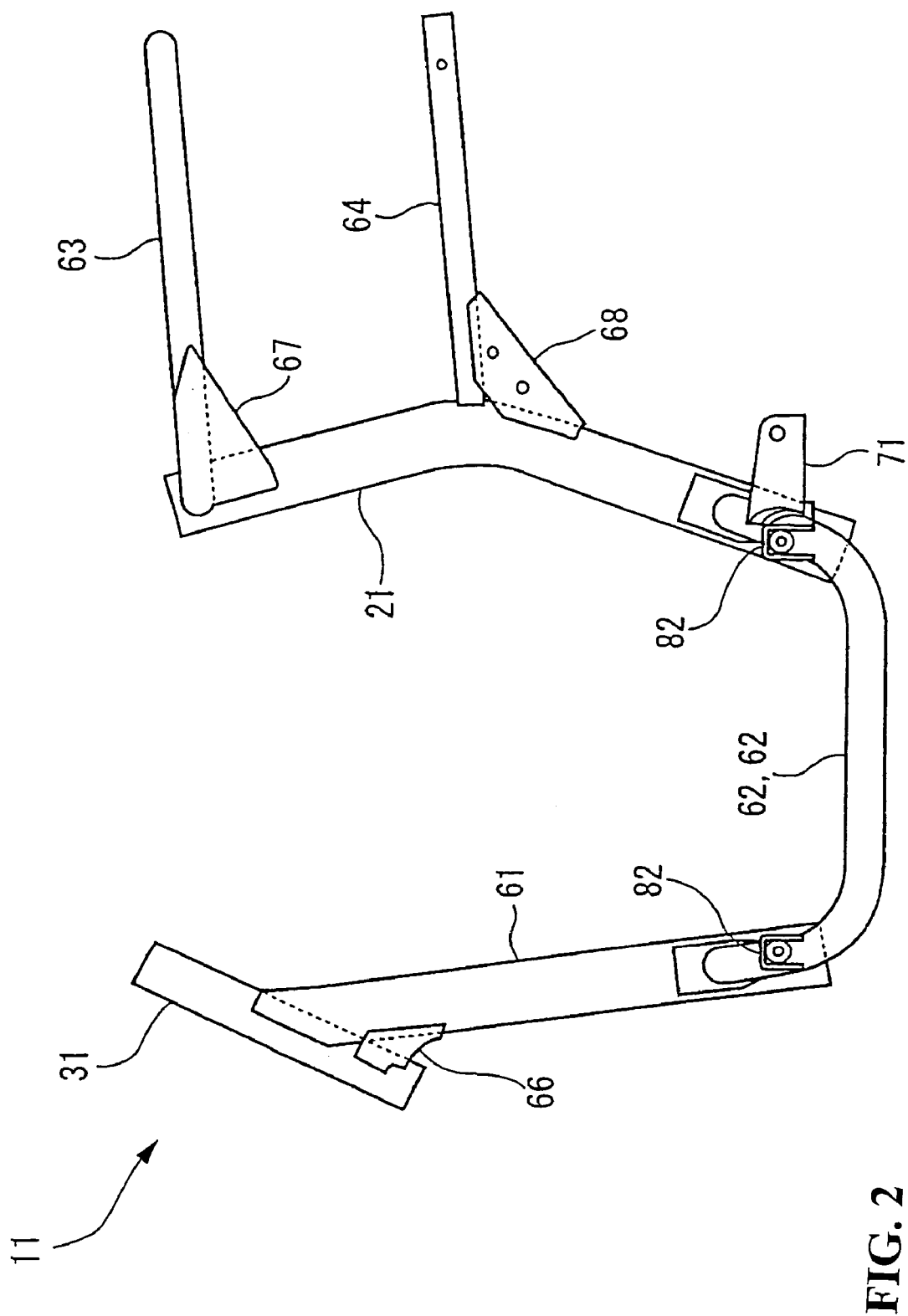
FIG. 2 is a side view showing a vehicle body frame of the electrically-driven vehicle according to the present invention.

FIG. 2 is a side view showing the vehicle body frame of the electrically-driven vehicle according to this embodiment, wherein the vehicle body frame 11 includes the above-mentioned head pipe 31, a downward pipe 61 which extends straight and substantially downwardly from the head pipe 31 and a pair of left and right lower pipes 62, 62 which extend downwardly, rearwardly and upwardly from the down pipe 61. The above-mentioned L-shaped seat post 21 is mounted on the lower pipes 62, 62 with a seat frame 63 extending rearwardly from an upper end portion of the seat post 21. An intermediate frame 64 is provided which extends rearwardly from the intermediate portion of the seat post 21. Reinforcing members 66, 66, 67, 67, 68, 68, (only symbols 66, 67, 68 on the front side being indicated) are provided together with a power support member 71 which is mounted on a lower end portion of the seat post 21 for mounting the swing shaft of the power unit 22 (see FIG. 1).

By forming the head pipe 31, the downward pipe 61, the lower pipes 62, 62 and the seat post 21 of the vehicle body frame 11 in a substantially U shape, it is possible to provide a simplified vehicle body frame 11 while having the functions necessary for the electrically-driven vehicle 10 wherein the handle 13 and the seat 27 are supported on end portions of the U shape shown in FIG. 1. At the same time, a bottom of the U shape supports the floor step 17 and accommodates the battery 18 therein.

Figure 3:
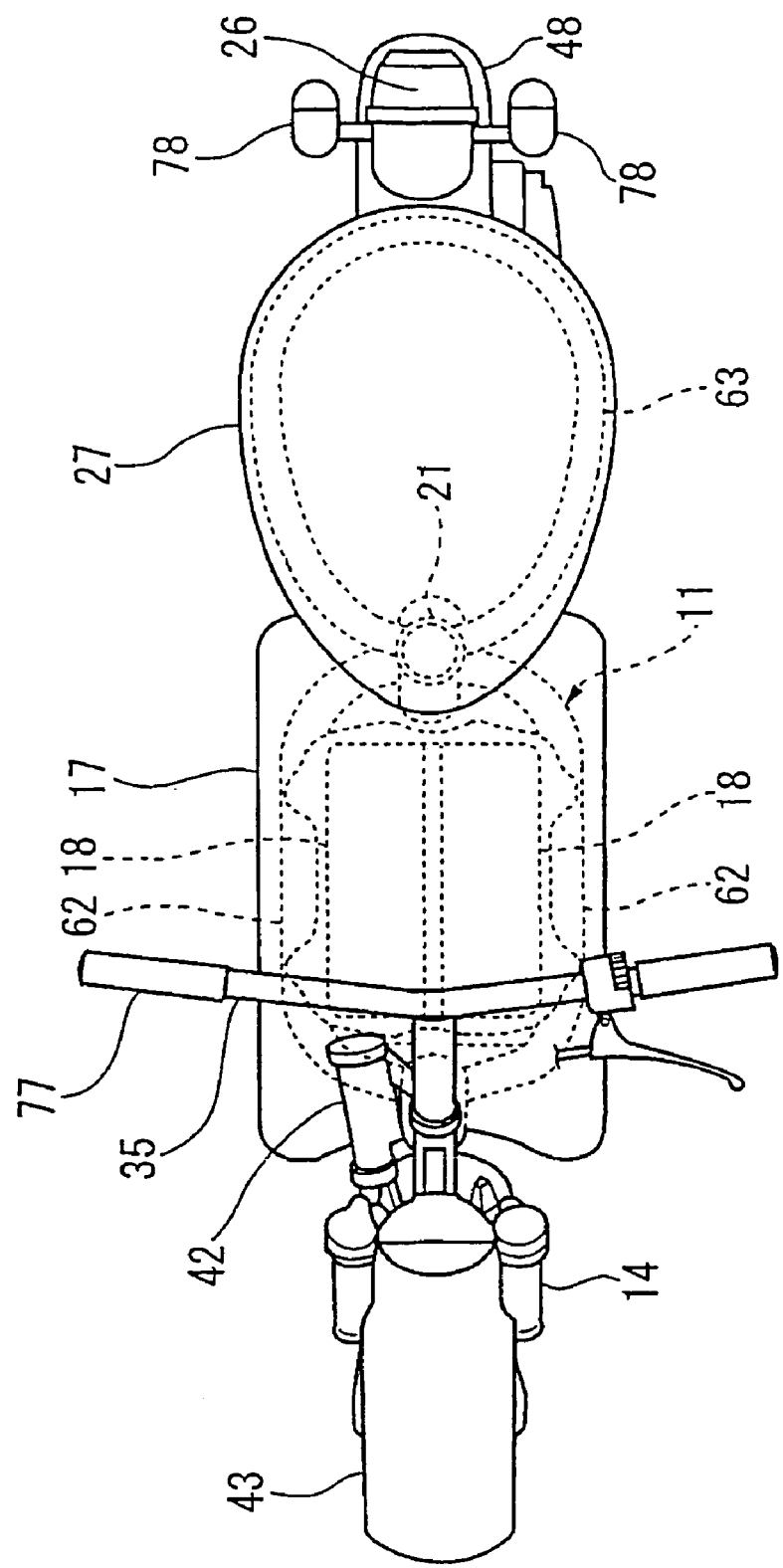
FIG. 3 is a plan view of the electrically-driven vehicle according to the present invention.

FIG. 3 is a plan view of the electrically-driven vehicle according to the present invention showing the arrangement in which the lower pipes 62, 62 of the vehicle body frame 11 are arranged below the floor step 17 having an approximately quadrangular shape. The batteries 18, 18 are arranged between these lower pipes 62, 62 in a state wherein the batteries 18, 18 are arranged in parallel in the left-and-side direction. A grip 77 is provided for adjusting an output of a motor (described later) with blinkers 78, 78 being mounted on the left and right sides of the tail lamp 26. The grip 77 may be constituted of a grip which is used in a usual electrically-operated motor cycle or the like in which the grip is rotated by grasping the grip per se or a lever-type grip (a thumb throttle) which is used in an ATV (All Terrine Vehicle) or the like.

Figure 4:
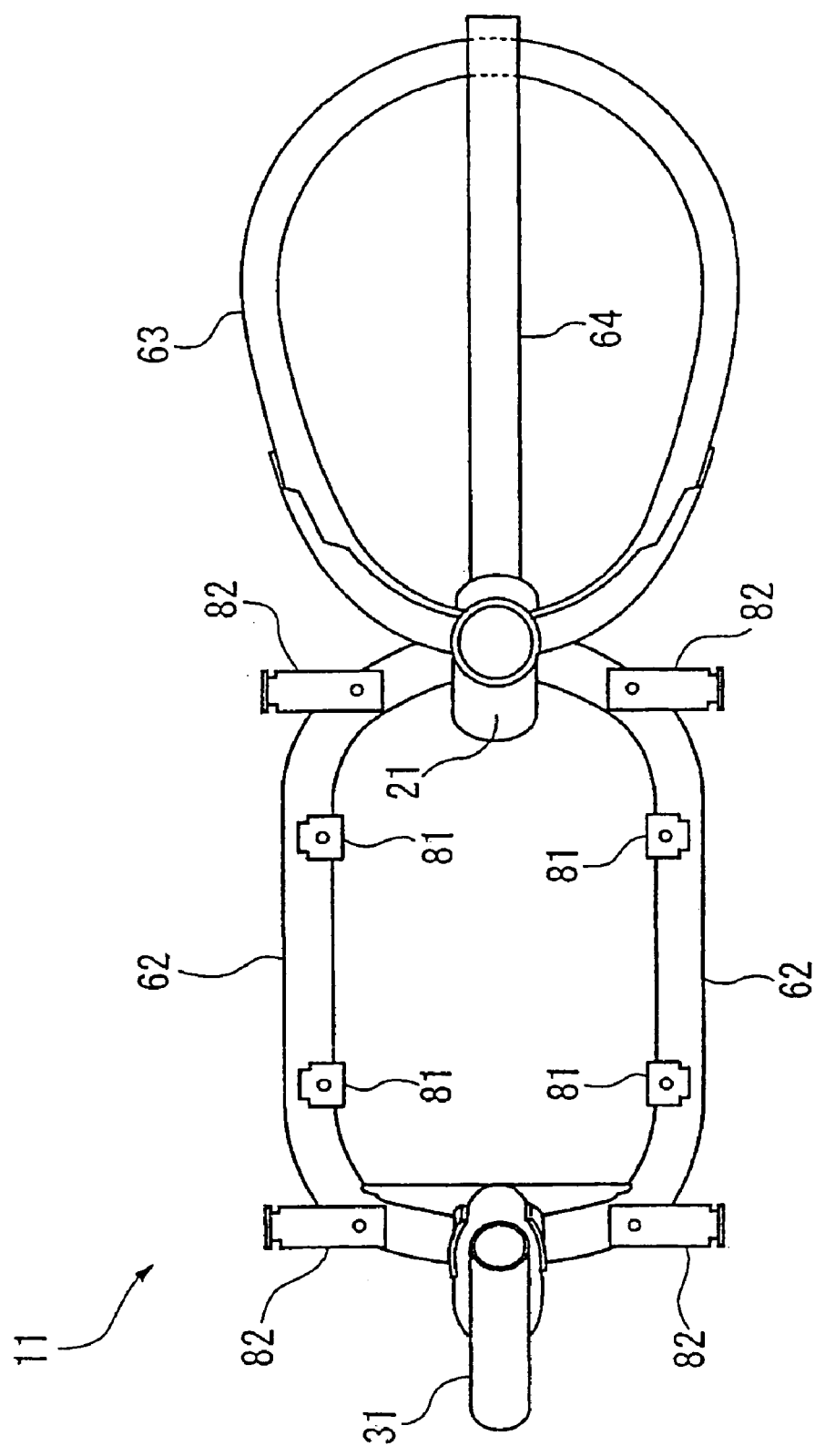
FIG. 4 is a plan view showing a vehicle body frame according to the present invention.

FIG. 4 is a plan view showing the vehicle body frame of the electrically-driven vehicle according to this embodiment showing the constitution in which by forming the seat frame 63 of the vehicle body frame 11 into a circular shape, an elliptical shape or a shape which is close to these shapes, a periphery of a helmet 52 (see FIG. 1) is engaged with the inside of the seat frame 63 so as to hold the helmet 52 by the seat frame 63. First brackets 81 . . . ( . . . indicating a plural number, the same being applicable to the description hereinafter) are mounted on the lower pipes 62, 62 for fixing the floor step 17 (see FIG. 3) to the lower pipes 62, 62. Second brackets 82 . . . are mounted on the lower pipes 62, 62 for fixing the floor step 17 and the under cover 44 (see FIG. 1) to the lower pipes 62, 62.

Figure 5:
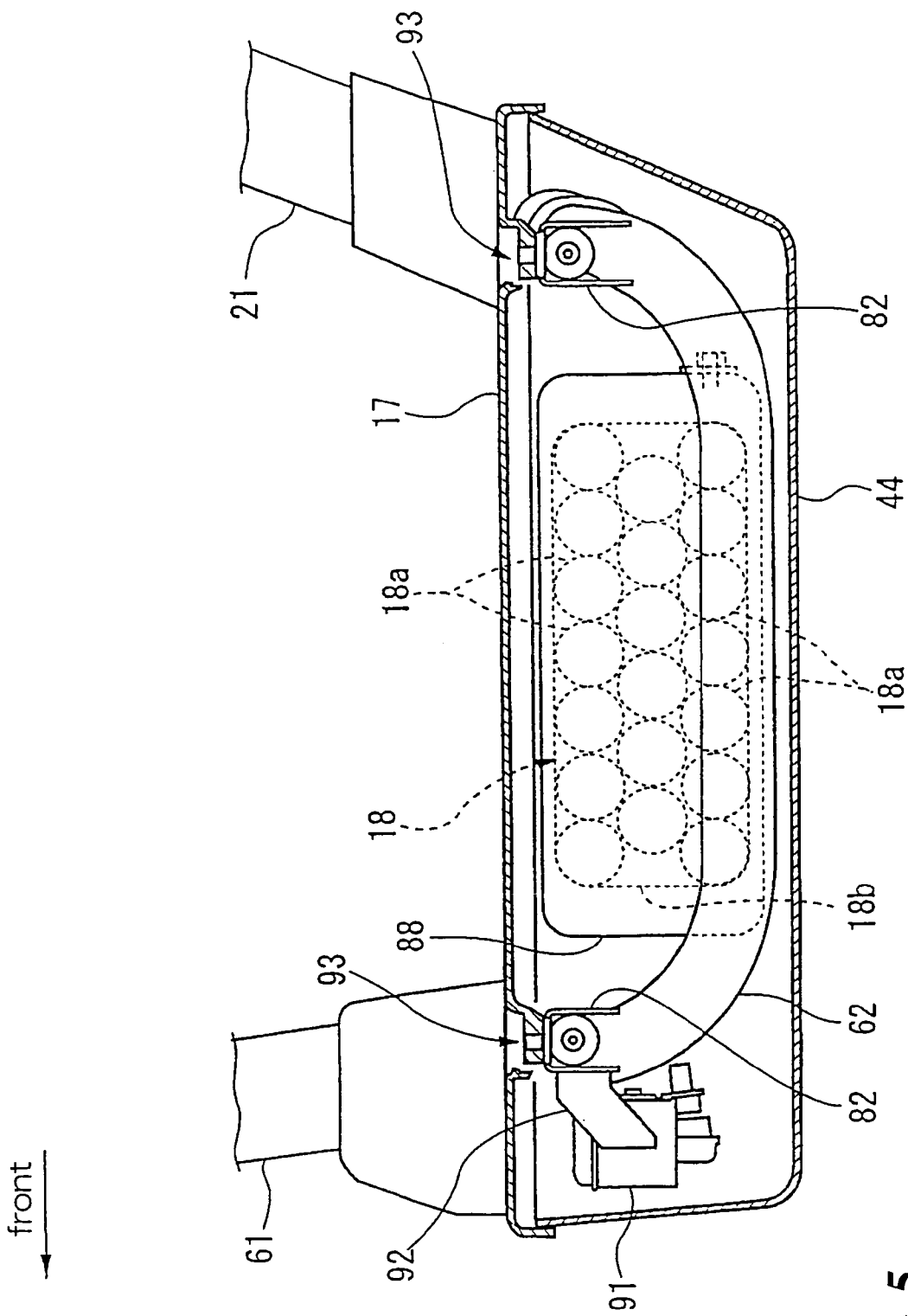
FIG. 5 is a cross-sectional view showing a battery mounted on the electrically-driven vehicle according to the present invention.

FIG. 5 is a cross-sectional view showing the battery which is mounted on the electrically-driven vehicle according to this embodiment, wherein an arrow (front) in the drawing indicates the front portion of the vehicle (the same being applicable to the description hereinafter).

The battery 18 is arranged below the floor step 17 in a state wherein a plurality of columnar nickel-hydrogen battery cells 18a . . . are stacked like barrels and are wrapped with the above-mentioned shrink pack 18b and are accommodated in the inside of a battery case 88. A relay 91 is provided for blinking which is mounted on one lower pipe 62 by way of a bracket 92 with mounting portions 93 being formed on the floor step 17 for mounting the floor step 17 on the second brackets 82 . . . .

Figure 6:
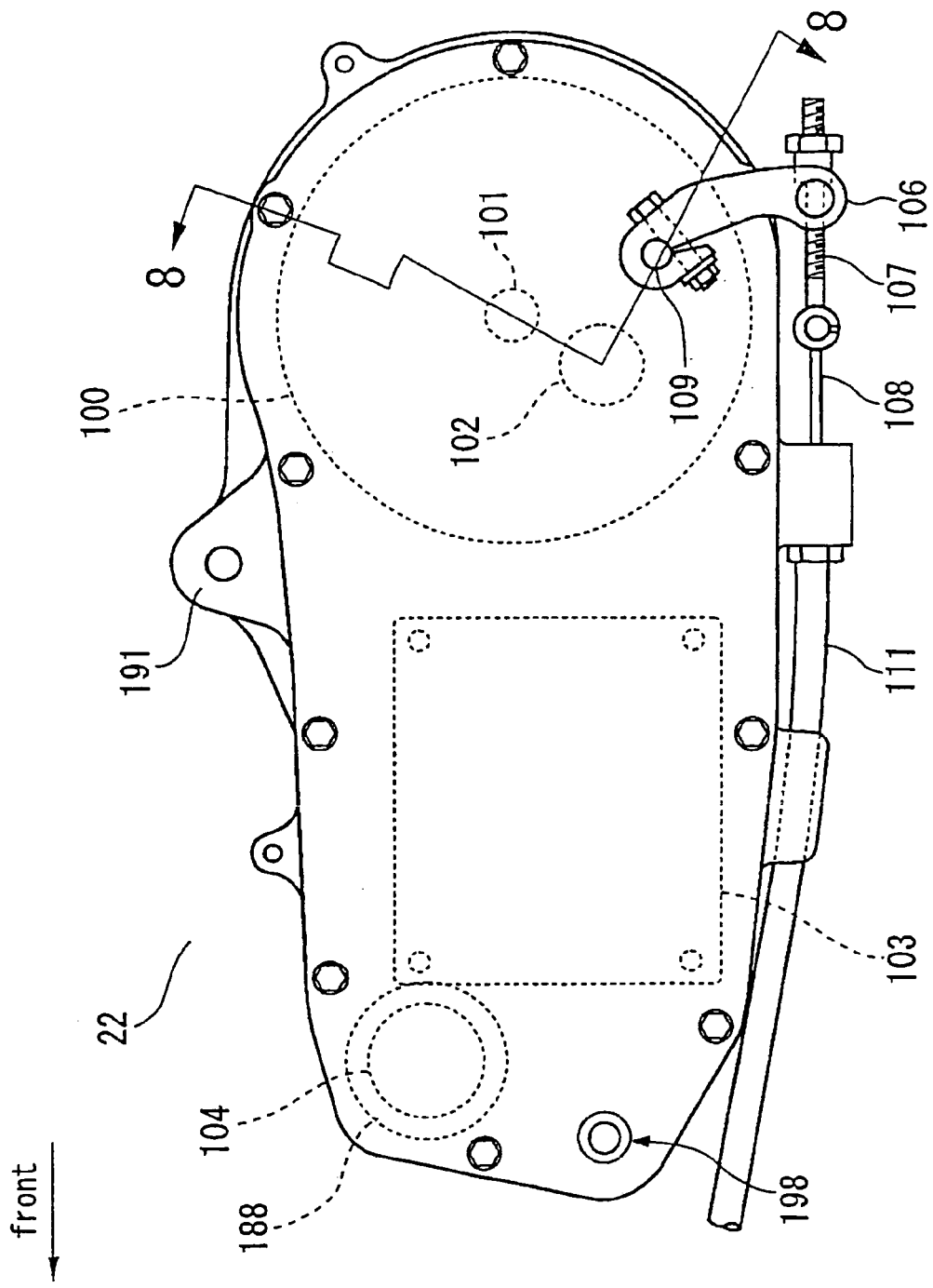
FIG. 6 is a side view of a power unit according to the present invention.

FIG. 6 is a first side view of the power unit according to this embodiment illustrating a view which is observed from a side opposite to a rear wheel 23 (see FIG. 1) with respect to the power unit 22.

The power unit 22 accommodates a motor 100 in a rear half portion thereof and, at the same time, connects an output shaft 101 of the motor 100 to an axle 102 of the rear wheel 23 (see FIG. 1) and mounts a driver 103 for controlling electric power supplied to the motor 100, that is, for controlling the driving of the motor 100 and a smoothing capacitor 104 which is attached to the driver 103. A capacitor casing 188 is provided for accommodating the smoothing capacitor 104.

Here, the power transmission method adopted by this power unit 22 is of a reduction type for transmitting an output from the motor 100 to the rear wheel 23 by way of a speed reduction mechanism (described later). Further, the driver 103 includes a switching member such as a power FET (Field Effect Transistor).

A brake arm 106 is provided which constitutes a drum brake which brakes the rear wheel 23 with an adjustment member 107 being mounted on a distal end of the brake arm 106. A wire 108 is connected to the adjustment member 107 as well as a brake lever (not shown in the drawing) with an outer cable 111 which movably accommodates the wire 108. Thus, by gripping the brake lever, the brake arm 106 is swung by way of the wire 108 and the adjustment member 107. A cam member is mounted on a distal end of the brake shaft 109 which constitutes a rotary shaft of the brake arm 106 that is rotated with a brake shoe (described later in detail) that is brought into pressure contact with a brake drum (described later in detail) by the cam member thus braking the rear wheel 23. The adjustment member 107 is a member for adjusting an initial angle of the brake arm 106. A cushion lower end mounting portion 191 is provided for mounting a lower end of the rear cushion unit 24 (see FIG. 1). A frame mounting member 198 is mounted on the power unit support member 71 (see FIG. 2) on the vehicle body frame 11 (see FIG. 2) side by way of the swing shaft.

In the constitution of this embodiment, the output shaft 101 of the motor 100 is arranged in a state wherein the output shaft 101 is offset in the upper oblique and rearward direction of the axle 102. By arranging the output shaft 101 and the axle 102 in this manner, it is possible to shorten a length of the vehicle body in the forward/backward direction. Thus, the vehicle body can be miniaturized. Further, the output shaft 101 may be arranged in the upper oblique frontward direction of the axle 102.

Figure 7:
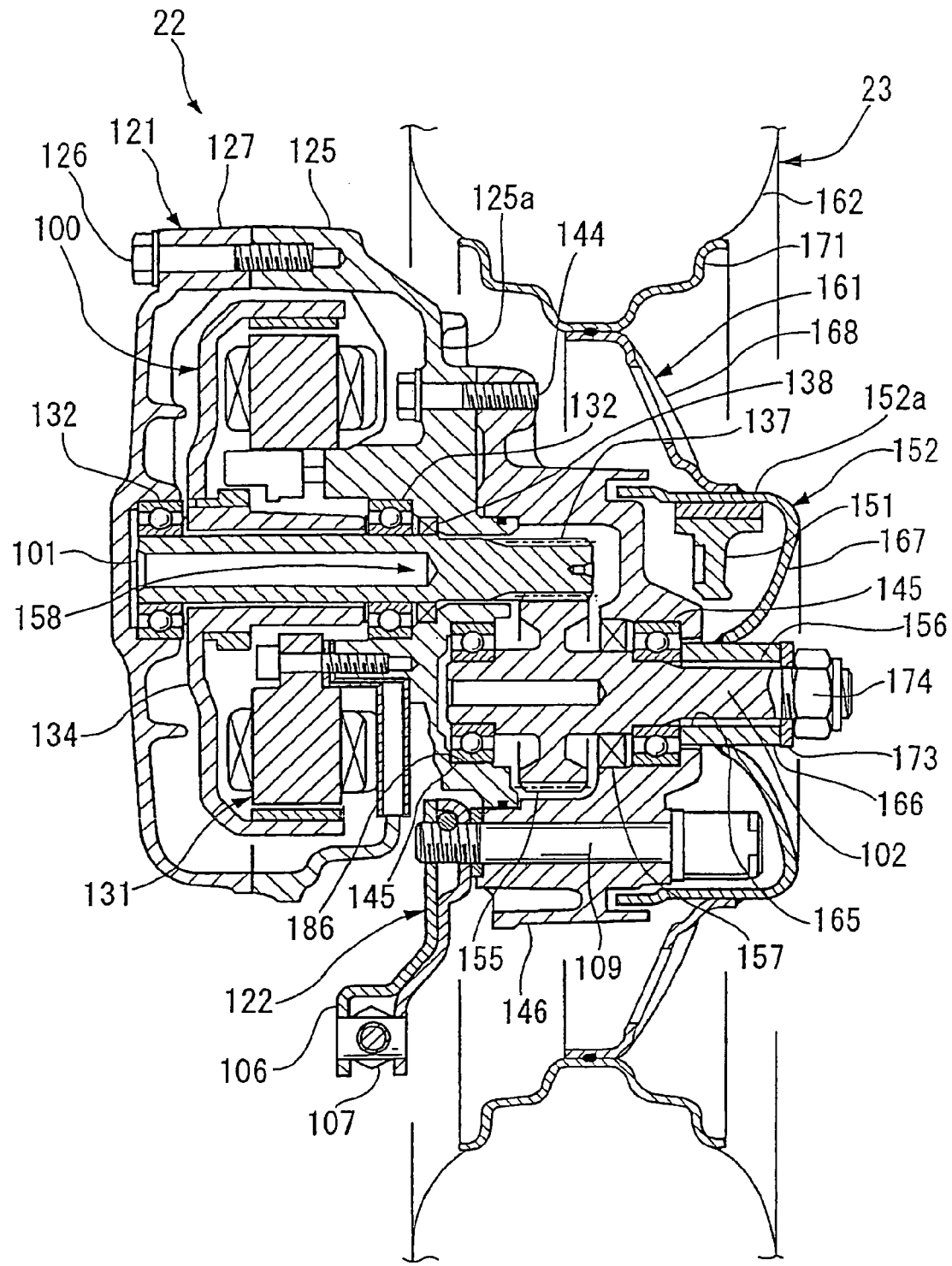
FIG. 7 is a cross-sectional view taken along a line 8-8 in FIG. 6.

FIG. 7 is a cross-sectional view taken along a line 8-8 in FIG. 6, wherein the power unit 22 includes a unit casing 121 which accommodates the motor 100, a drum brake device 122 which is mounted on a side surface of the unit case 121, and the above-mentioned axle 102 which is mounted on the drum brake device 122.

The unit casing 121 is a two-split member which includes a casing body 125 on a rear wheel 23 side and a casing cover 127 which is mounted on an opening side of the casing body 125 using bolts 126 . . . (only one bolt 126 shown in the drawing).

The motor 100 is of an outer rotor type which includes a stator 131 which is mounted on the casing body 125, the above-mentioned output shaft 101 which is rotatably mounted on the unit casing 121 by way of bearings 132, 132, and a rotor 134 which is mounted on the output shaft 101 by a spline coupling. Teeth portions 137 are formed on a distal end of the output shaft 101. Adjust seal 138 is provided.

The drum brake device 122 is a device which is mounted on an inner side surface 125a of the casing body 125 using bolts 144 . . . and includes a base portion 146 which rotatably supports the axle 102 together with the casing body 125 by means of bearings 145, 145 with the above-mentioned brake shaft 109 being rotatably mounted on the base portion 146 for mounting the brake arm 106 on one end portion thereof. A cam member (not shown in the drawing) is mounted on another end of the brake shaft 109 with a brake shoe 151 that is opened radially outwardly by being pushed due to the rotation of the cam member. A cup-shaped brake drum 152 is provided for bringing the brake shoe 151 into contact with an inner surface thereof, and the above-mentioned brake arm 106.

The axle 102 is a member on which a toothed portion 155 is meshed with a toothed portion 137 of the output shaft 101 and a male spline 156 for allowing the formation of a coupling with the rear wheel 23. A dust seal 157 is provided which is interposed between the base portion 146 and the axle 102 with a hole portion 186 which allows the axle 102 to pass therethrough.

The output shaft 101 on which the above-mentioned toothed portion 137 is formed and the axle 102 on which the toothed portion 155 is formed are members which constitute the speed reduction mechanism 158.

The rear wheel 23 includes a wheel portion 161 which is mounted on the axle 102 and a tire 162 which is mounted on an outer peripheral portion of the wheel portion 161.

The wheel portion 161 includes the above-mentioned brake drum 152 which includes a boss portion 166 on which a female spline 165 is coupled with the male spline 156 formed on the axle 102. A cup-shaped drum portion 167 is provided together with a disc portion 168 which is mounted on an outer peripheral surface 152a of the brake drum 152. A rim portion 171 is mounted on an outer peripheral portion of the disc portion 168. A washer 173 and a nut 174 are provided for mounting the rear wheel 23 on the axle 102.

The constitution of the power unit 22 shown in FIG. 7 is explained in further detail.

The wheel portion 161 is a member which has a center side (that is, a drum portion 167 side) thereof projecting to a side opposite to the motor 100 from the center in the vehicle widthwise direction of the rear wheel 23. That is, a boss portion 166 which becomes the rotary center portion in the rear wheel 23 is in an offset state.

Further, in the inside of the wheel portion 161 which is offset in the above-mentioned manner, the speed reduction mechanism 158 is arranged in an embedded manner between the motor 100 and the rear wheel 23. Accordingly, even when the reduction-type power unit 22 is adopted, the amount of projection of the power unit 22 in the vehicle-sideward direction with respect to the rear wheel 23 can be decreased. Accordingly, it is possible to arrange the power unit 22 which is a heavy object and the rear wheel 23 at an approximately center in the vehicle width direction.

Next, the power transmission from the motor 100 to the rear wheel 23 is explained.

A drive current is supplied to the stator 131 in response to the control from the driver 103. The control of the drive current is performed using a PWM (Pulse Width Modulation) control, for example.

The PWM control is a method for controlling the rotational speed (and torque) of the motor 100 by applying a pulse-like voltage to the motor 100 and by changing a ratio of intervals of ON/OFF of the pulse (a duty ratio).

Due to the above-mentioned PWM control, the rotor 134 is rotated due to a rotary magnetic field which is generated around the stator 131 and the output shaft 101 is rotated correspondingly. The power from the output shaft 101 is subjected to a speed reduction by way of the toothed portion 137 and the toothed portion 155 and is transmitted to the axle 102. In this manner, power from the motor 100 is subjected to a speed reduction and is transmitted to the rear wheel 23.

In this embodiment, a speed reduction mechanism which uses the output shaft 101 and the axle 102 and has a fixed reduction ratio is illustrated. However, it may be possible that the power from the motor 100 is subjected to a changeover of speed by another transmission and is transmitted to the rear wheel 23. For such a speed reduction mechanism, a variable-speed transmission may be used, for example.

Further, the electrically-driven vehicle according to this embodiment also includes a regenerative charging mechanism. That is, the electrically-driven vehicle 10 has a function that when the electrically-driven vehicle 10 is subjected to a reduction in speed by operating the drum brake device, the front brake or the like, the motor 100 is driven as a power generator and a rotational force which is transmitted from the rear wheel 23 to the motor 100 at the time of performing a reduction in speed is converted into electric energy and the electric energy is stored in the batteries 18, 18.

Figure 8:
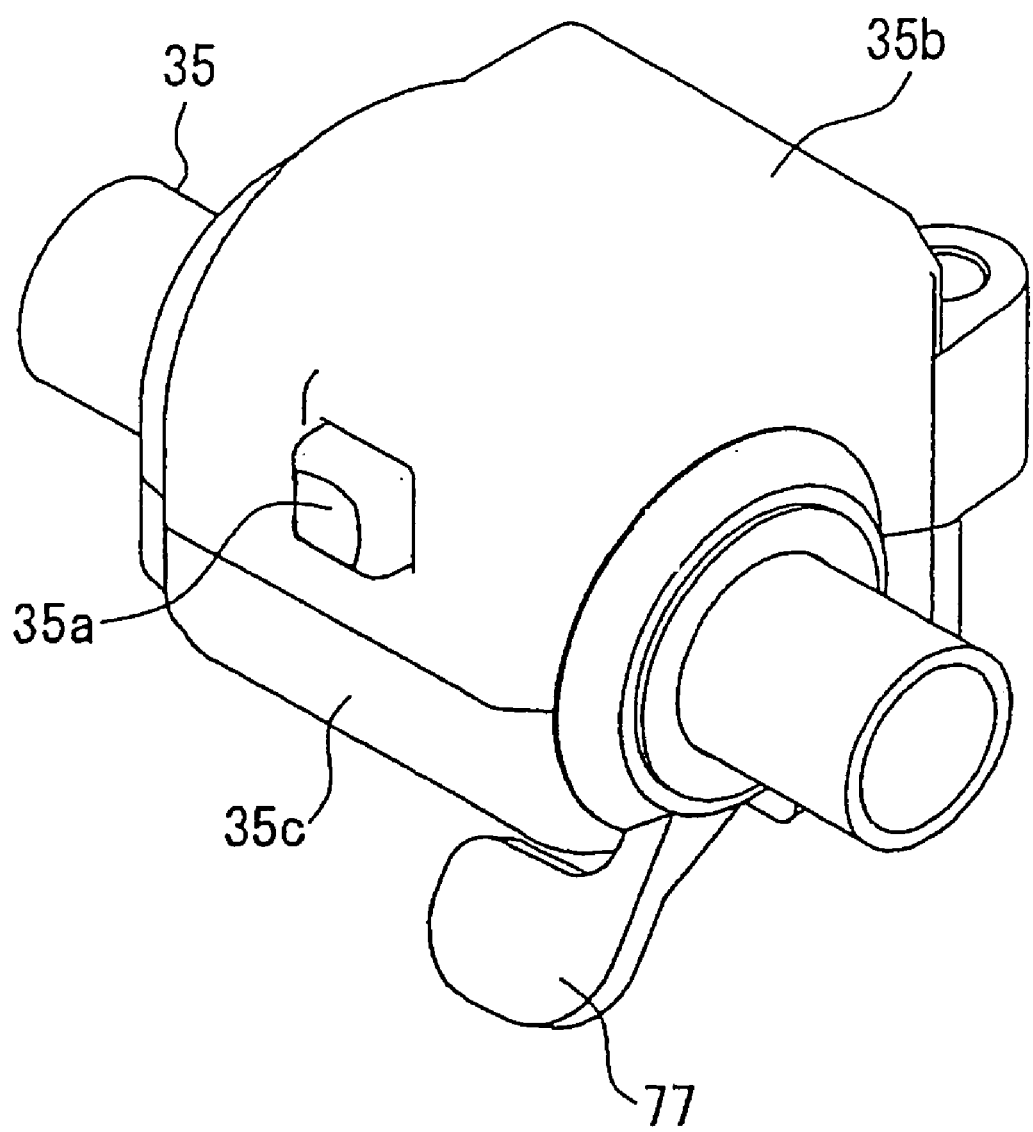
FIG. 8 is a perspective view showing the vicinity of a push-walk switch according to the present invention.

FIG. 8 is a perspective view of the push-walk switch 35a and the grip 77 which are provided on the handle lever 35 of the electrically-driven vehicle of this embodiment, wherein the grip 77 includes the above-mentioned lever-method thumb-throttle type grip. The push-walk switch 35a which the rider pushes down when the rider performs the push-walk control is fixed to the handle lever 35 by way of an upper switch housing 35b and a lower switch housing 35c.

Figure 9:
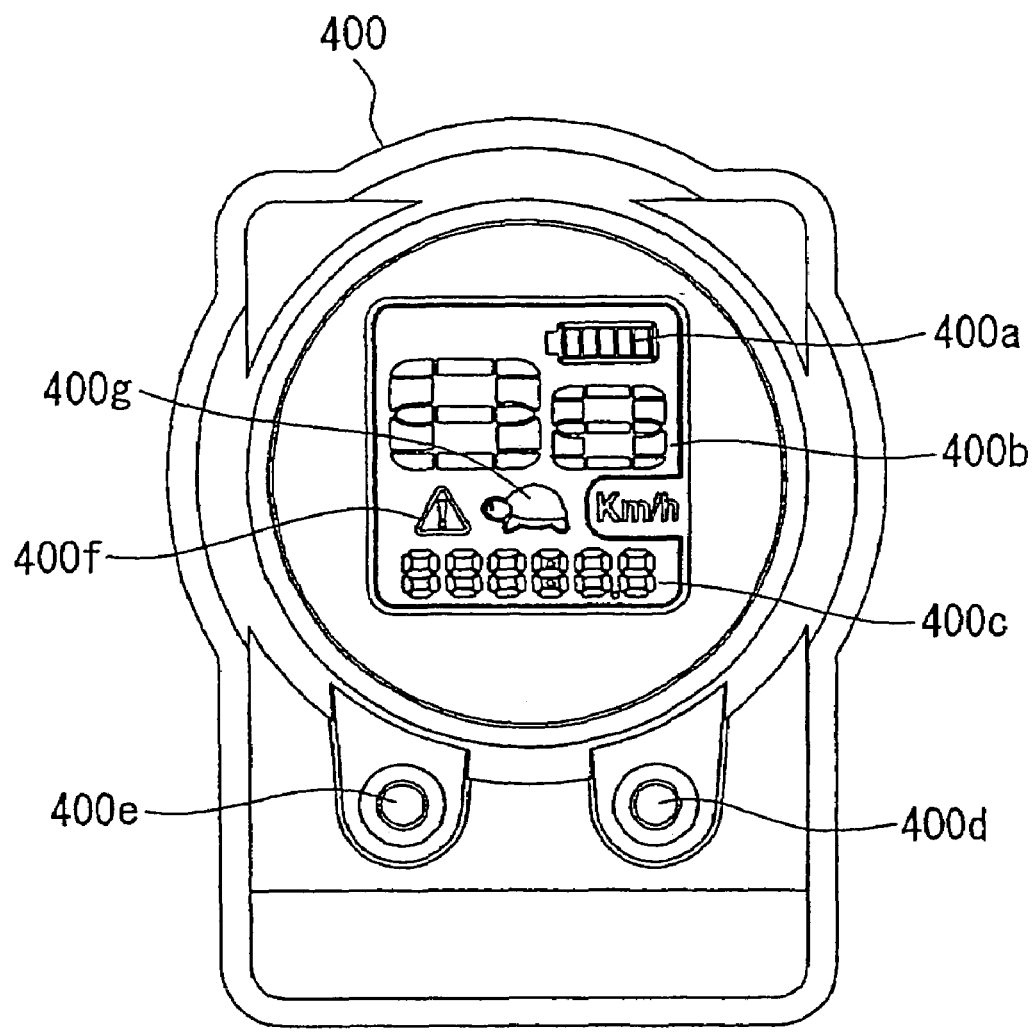
FIG. 9 is a front view of a display part of a speed meter according to the present invention.

FIG. 9 is a front view of a display part of a speed meter 400 of the electrically-driven vehicle 10 of this embodiment. A battery residual capacitance display part 400a is provided which indicates a battery residual capacitance and informs the rider of the residual capacitance based on a reduction in lighting of a block in accordance with the battery residual capacitance. A speed display part 400b is provided for displaying the speed digitally. A distance display part 400c digitally displays a total traveled distance, a trip traveled distance and a residual traveled distance. The rider can change over the total traveled distance, the trip traveled distance and the residual traveled distance by using a switch 400d and a switch 400e. An attention display part 400f is provided for turning on the light and for attracting the attention of the rider when the driver 103 detects an overheating or an overcurrent of the motor 100 and determines the occurrence of a problem. A battery residual capacitance alarm display part 400g is provided for also illustrating the battery residual capacitance in the same manner as 400a. In this case, however, the residual capacitance alarm display part is turned on when the residual battery capacitance becomes below 20%, for example, and gives a warning to the rider.

Figure 10:
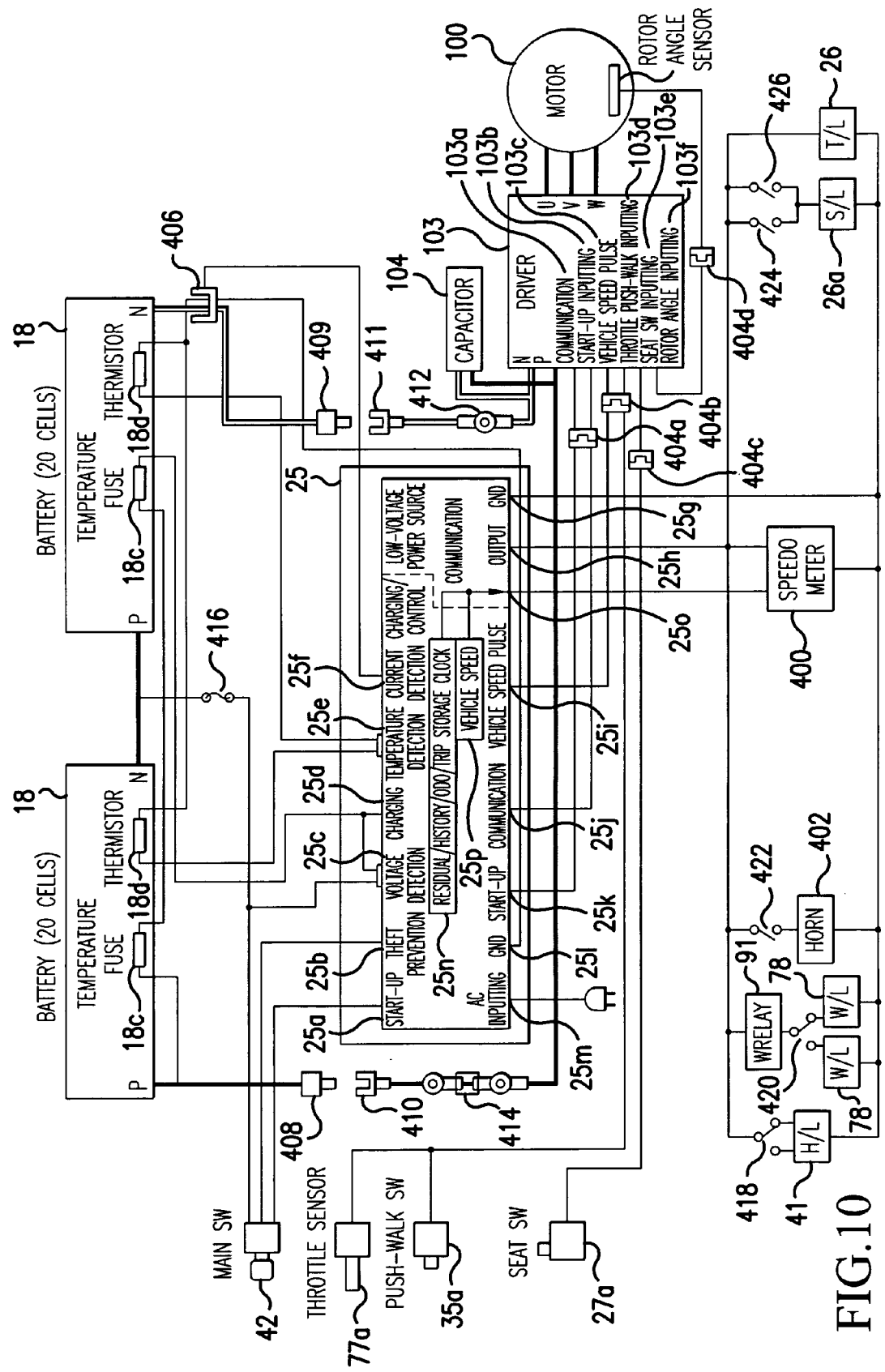
FIG. 10 is an electric wiring diagram of the electrically-driven vehicle according to the present invention.

FIG. 10 is an electric circuit diagram of the electrically-driven vehicle according to this embodiment. Hereinafter, an explanation is made with respect to the connection between the respective ports of the battery control unit 25 and other devices. A main switch 42 which starts the battery control unit 25 is connected with a start port 25a and a theft prevention port 25b of the battery control unit 25. Further, the main switch 42 is connected with a circuit for connecting between a negative pole of the left-side battery 18 and the positive pole of the right-side battery 18 in FIG. 10 by way of a fuse 416, wherein the circuit is branched and is connected with a voltage detection port 25c. Temperature fuses 18c, 18c of the batteries 18, 18 are connected in series with one ends of the temperature fuses 18c, 18c being connected with a charge port 25d and circuits thereof also being connected with the voltage detection port 25c.

Respective one ends of thermistors 18d, 18d of the batteries 18, 18 are connected with the temperature detection port 25e and respective another ends of the thermistors 18d, 18d are connected with a GND port (ground port) 25l. An ammeter 406 is mounted on a circuit for connecting the negative pole of the battery 18 and the negative pole of the driver 103 and a circuit which is connected with the thermistor 18d and the GND port 25l, while the ammeter 406 is connected with a current detection port 25f. An output port 25h is connected with one end of the tail lamp 26, a speed meter 400 and a relay 91 for the blinker of the electrically-driven vehicle and is connected with one end of the head lamp 41 via a switch 418 and is connected with one end of a stop lamp 26a via switches 424, 426, and is connected with one end of a horn 402 via a switch 422. Another end of the relay 91 for the blinker is connected with one end of blinker lamps 78, 78 via the switch 420. A GND port 25g is connected with another end of the tail lamp 26, the speed meter 400, the head lamp 41, the stop lamp 26a, the horn 402, and blinker lamps 78, 78.

A vehicle-speed pulse port 103c of the driver 103 controls the motor 100 and is connected with a vehicle-speed pulse port 25i via a coupler 404a. The vehicle-speed pulse port 25i is connected with a vehicle-speed detector 25p of the battery control unit 25. A vehicle-speed pulse is transmitted from the driver 103 to the vehicle-speed detector 25p and the vehicle-speed detector 25p calculates a vehicle speed based on the received vehicle-speed pulse. The vehicle-speed detector 25p is connected with the speed meter 400 via a communication port 25o and the calculated vehicle speed is transmitted to the speed meter 400 and is displayed on the speed meter 400. The transmission and the reception of the information between the battery control unit 25 and the driver 103 are performed using a circuit between a communication port 25j of the battery control unit 25 and a communication port 103b of the driver 103 which are connected with each other via a coupler 404a. In the same manner, a start-up input port 103a of the driver 103 is connected with a start port 25k via a coupler 404a and an instruction such as the initialization or the like is transmitted to the inside of the driver 103 from the battery control unit 25 through this circuit. An AC input port 25m is a port for connection with an external AC power source at the time of charging. In the battery control unit 25, a memory 25n is provided for storing the battery residual quantity information, the history information, the total traveled distance information (an odometer in FIG. 10), the trip traveled distance information (a trip meter in FIG. 10) and the clock information. The memory 25n is connected with the speed meter 400 via the communication port 25o and the content of the memory 25n is transmitted to the speed meter 400, and the speed meter 400 which receives this information displays the corresponding information on the respective display parts explained in conjunction with FIG. 9. The battery residual quantity information is displayed on the battery residual quantity display part 400a and the battery residual quantity alarm display 400g is turned on in a given case. The total traveled distance information and the trip traveled distance information are displayed on the distance display part 400c.

Hereinafter, an explanation is made with respect to the connection between devices other than the battery control unit 25 in FIG. 10. A throttle sensor 77a for detecting the opening of the throttle which is mounted on the grip 77 and a push-walk switch 35a for starting up the control of the push walk which is mounted on the handle bar 35 are connected with a throttle/push-walk input port 103d of the driver 103 via a coupler 404b. The seat switch 27a for detecting a sitting/non-sitting position of a rider and is mounted on the seat 27 and is connected with a seat switch input port 103e of the driver 103 via a coupler 404c. A rotor angle input port 103f of the driver 103 is connected with a rotor angle sensor of the motor 100 via the coupler 404d, wherein the rotor angle information of the motor 100 is transmitted to the driver 103 and the driver 103 obtains a vehicle-speed pulse based on a value of the rotor angle information. A positive pole of the driver 103 is connected to a positive pole of the left-side battery in FIG. 10 and one terminal of a smoothing capacitor 104 via a fuse 414, a jack 410 and a plug 408. A negative pole of the driver 103 is connected to a negative pole of the right-side battery 18 in FIG. 10 and another terminal of the smoothing capacitor 104 via a fuse 412, a jack 411 and a plug 409.

Next, an explanation is made with respect to functions of the battery control unit 25. The battery control unit 25 has a function of performing a charge control of the battery based on the information obtained via a voltage detection port 25c and a temperature detection port 25e. Further, the battery control unit 25 has a function of calculating the battery residual quantity based on a voltage value of the batteries 18, 18 and a current value obtained via a current detection port 25f. The battery control unit 25 is started up in response to the power source connection of an AC input port 25m, the turning-on of the main switch 42 and the overvoltage of the battery and processing consisting of the charge control, the start-up of the driver and the starting of the driver in an overvoltage prevention mode are respectively performed. Further, when necessary, the battery control unit 25 also has a function of instructing a refreshing discharge to the driver 103 so as to allow the batteries 18, 18 to discharge.

Next, the operation up to the start-up of the motor is explained in conjunction with FIG. 10. First of all, when the main switch 42 is pushed, the battery control unit 25 is started up via the start-up port 25a of the battery control unit 25, and the voltage, the charge state, the temperature state and the electric current of the batteries 18, 18 are detected via the voltage detection port 25c, the charge port 25d, the temperature detection port 25e and the current detection port 25f of the battery control unit 25. The battery control unit 25 reads out the information stored in the memory 25n and updates the battery residual quantity information and the use history information in conformity with the detected stages of the batteries 18, 18. Then, the battery residual information, the history information, the total traveled distance information, the trip traveled distance information and the clock information which are stored in the memory 25n are transmitted to the speed meter 400 via the communication port 25o. The speed meter 400 which receives this information displays the corresponding information on the respective display parts explained in conjunction with FIG. 9. The battery residual quantity information is displayed on the battery residual quantity display part 400a and the battery residual quantity alarm display 400g is turned on in a given case. The total traveled distance information and the trip traveled distance information are displayed on the distance display pat 400c.

Next, the driver 103 is started up with the electric power supplied from the batteries 18, 18, wherein the start-up signal is transmitted to the start-up input port 103a of the driver 103 from the start-up port 25k of the battery control unit 25 whereby the driver 103 is initialized. The driver 103 detects the opening of the throttle of the throttle sensor 77a from the throttle/push-walk input port 103d and drives the motor 100 in response to an angle of the opening of the throttle. The motor 100 drives the rear wheel 23 via the speed reduction mechanism 158 (see FIG. 7). After the start-up of the motor 100, the driver 103 detects the rotor angle using the rotor angle sensor of the motor 100 via the rotor angle input port 103f of the driver 103 and detects the vehicle speed pulse based on the information. The detected vehicle speed pulse is transmitted to the vehicle speed pulse port 25i of the battery control unit 25 from the vehicle speed pulse port 103c of the driver 103 and is further transmitted to the vehicle speed detector 25p. The vehicle speed detector 25p converts the received vehicle speed pulse into a vehicle speed and transmits the vehicle speed to the speed meter 400 via the communication port 25o. Thus, the vehicle speed is displayed on the speed display part 400b of the speed meter 400. Further, the total traveled distance and the trip traveled distance are updated based on the information on the vehicle speed and the updated information is transmitted to the speed meter 400 in the same manner and is displayed on the distance display part 400c.

Next, an explanation is made with respect to the push-walk control operation in the above-mentioned embodiment.

Figure 11:
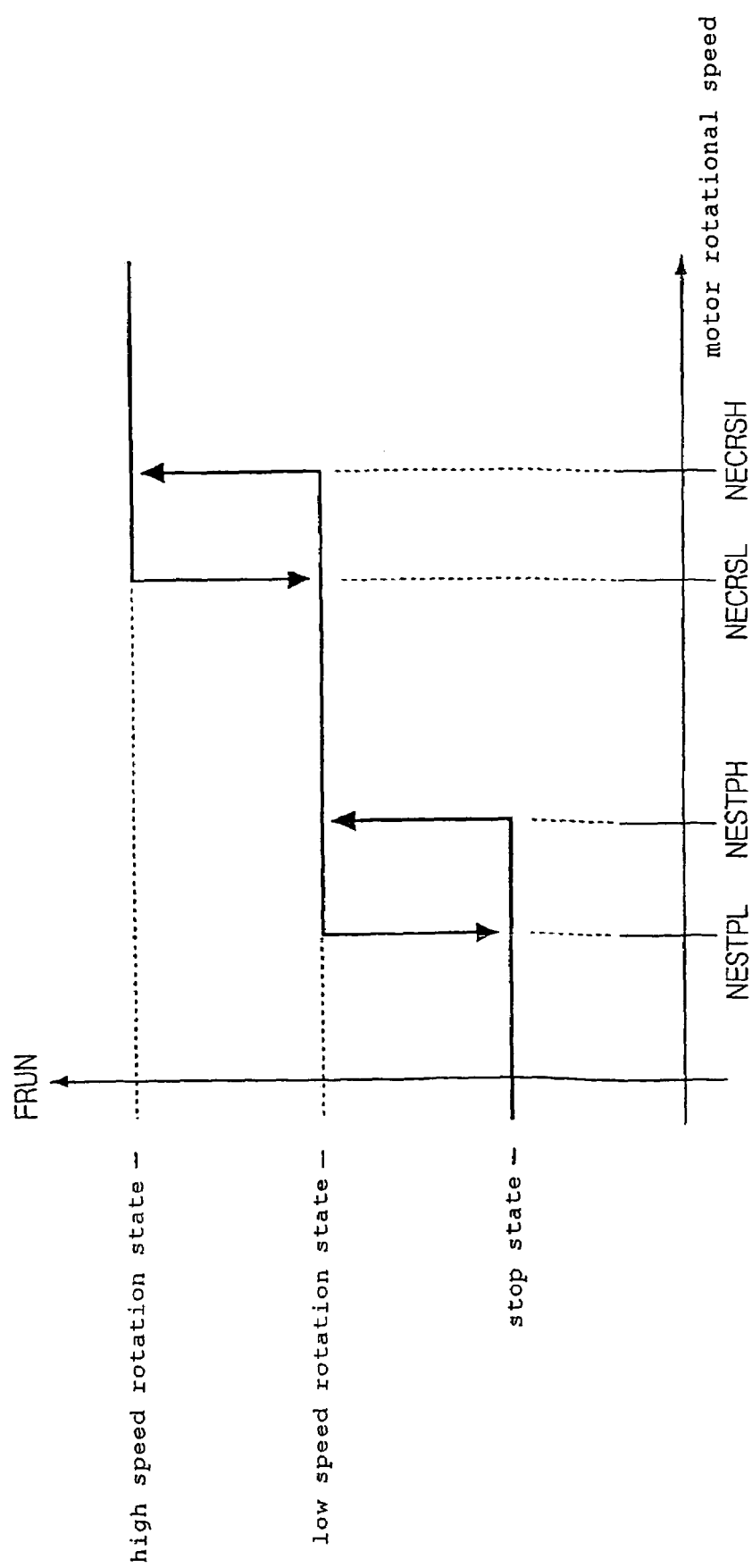
FIG. 11 is a state transition chart of a traveling speed flag according to the present invention.
Figure 12:
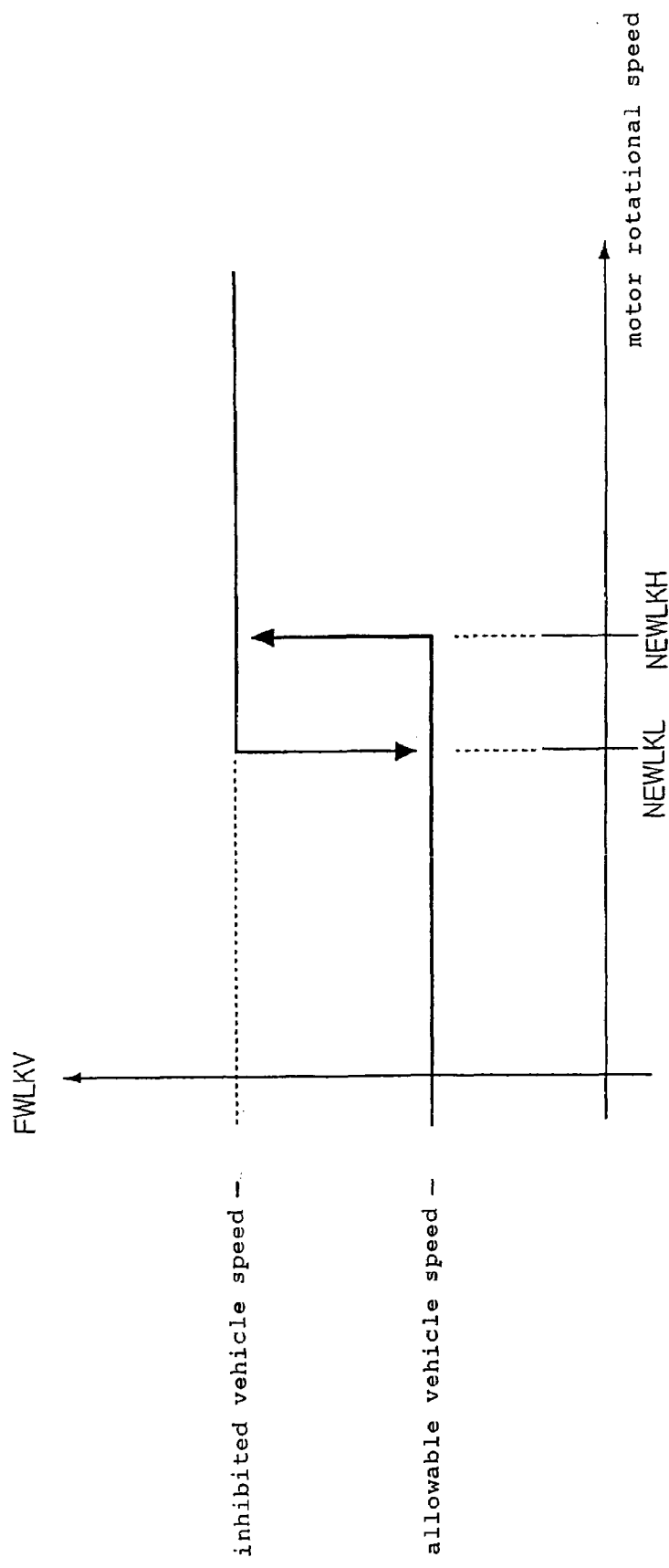
FIG. 12 is a state transition chart of a push-walk speed flag according to the present invention.

FIGS. 11 and 12 are provided for explaining, when the driver 103 performs the push-walk control and the throttle control during the push-walk control, a traveling speed flag and a push-walk speed flag which are used in the determination of conditions in these controls. FIG. 11 shows states to which the traveling speed flag (FRUN in the drawing) is moved or changed in response to the change of the rotational speed of the motor. A point at which the state of the flag is changed from the stop state to the low-speed rotation state at the time of acceleration is indicated by NESTPH in the drawing, while a point at which the state of the flag is changed from the low-speed rotation state to the stop state at the time of deceleration is indicated by NESTPL in the drawing. In the same manner, a point at which the state of the flag is changed from a low-speed rotational state to a high-speed rotational state at the time of acceleration is indicated by NECRSH in the drawing, while a point at which the state of the flag is changed from a high-speed rotation state to a low-speed rotation state at the time of deceleration is indicated by NECRSL in the drawing. Further, when the rotational speed of the motor<0, that is, when the rotation is inverted, the stop state is set in the traveling speed flag.

FIG. 12 shows the transition of the state of the push-walk speed flag (FWLKV in the drawing) which determines whether the speed is a speed which allows the push-walk or not in the push-walk control. A point at which the push-walk speed flag is changed from the allowable vehicle speed to the inhibited vehicle speed at the time of acceleration is indicated by NEWLKH in the drawing and a point at which the push-walk speed flag is changed from the inhibited vehicle speed to the allowable vehicle speed at the time of deceleration is indicated by NEWLKL in the drawing. Further, when the rotational speed of the motor<0, that is, when the rotation is inverted, the allowable vehicle speed is set in the push-walk speed flag.

Figure 13:
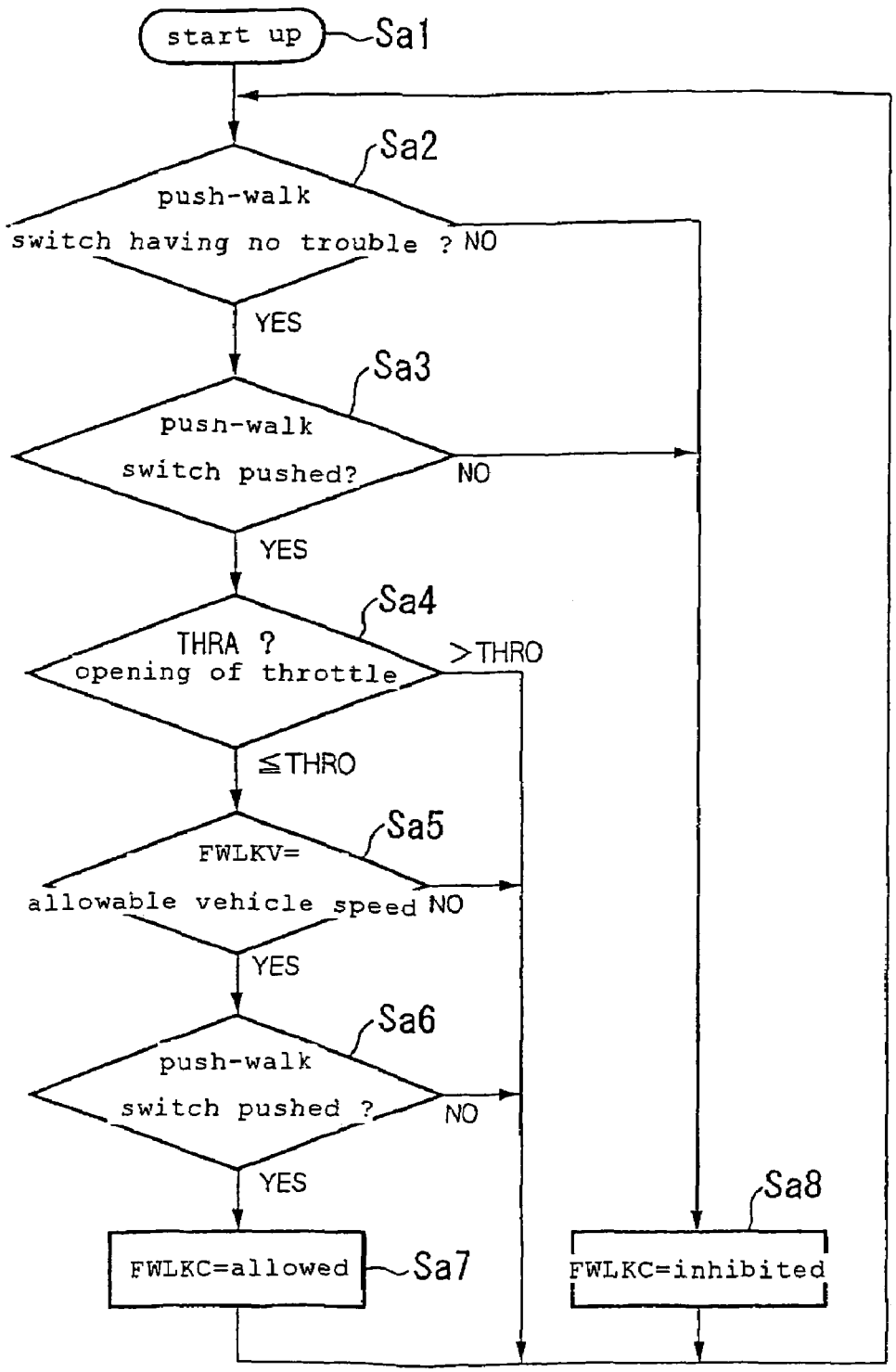
FIG. 13 is a flow chart of a push-walk control according to the present invention.

Next, the push-walk control is explained in conjunction with a flowchart shown in FIG. 13. As a premise, the driver 103 always detects a value of the opening of the throttle and the pushing state of the push-walk switch from the throttle/push-walk input port 103d, and monitors the trouble state of the throttle sensor 77a and the push-walk switch 35a based on a leak current of the coupler 404b.

First of all, in the start-up (step Sa1), the main switch 42 is started up and the push-walk control flag (FWLKC in the drawing) is set to the "inhibited" in the inside of the driver 103. Next, the driver 103 determines the trouble state of the push-walk switch 35a by making use of the leak current of the coupler 404b (step Sa2). When the push-walk switch 35a suffers from some trouble, the push-walk control flag is set to the "inhibited" (step Sa8). When the push-walk switch 35a is not in trouble, the pushing state of the push-walk switch 35a is determined (step Sa3). When the push-walk switch 35a is not pushed, the push-walk control flag is set to the "inhibited" (step Sa8). When the push-walk switch 35a is pushed, subsequently, the driver 103 receives the information on the opening of the throttle (THRA in FIG. 13) (step Sa4) and determines whether the value is not more than a given value (THRO) or not. Here, THRO which is a given value is an arbitrary voltage between a fully-closed voltage (for example, 0.8V) and a motor start-up voltage (for example, 0.9V) and the values equal to or below THRO exhibit the substantially fully-closed state. When the opening of the throttle exceeds the given value (THRO), the state of the push-walk control flag is maintained. When the opening of the throttle is substantially fully closed, subsequently, it is determined whether the push-walk speed flag (FWLKV in the drawing) is the allowable vehicle speed explained in conjunction with FIG. 12 or not (step Sa5). Since the push-walk control is driven provided that the push-walk switch 35a is continuously pushed, the driver 103 reads out and determines whether the push-walk switch 35a is pushed again after all of the above-mentioned conditions are satisfied or not (step Sa6). When the push-walk switch 35a is not pushed, the state of the push-walk control flag is maintained. When the push-walk switch 35a is pushed, the push-walk control flag (FWLKC in the drawing) is set to the "allowable" (step Sa7). Thus, the push-walk control becomes possible.

When the driver 103 assumes the state in which the push-walk control can be performed, the driver 103 inhibits the throttle control and starts the push-walk control. Thus, the motor 100 is driven at a given speed (for example, approximately 5 km/sec).

On the other hand, in the push-walk control inhibition state, the driver 103 does not receive the push-walk control. That is, in the state wherein the push-walk switch 35a is not pushed down, when the opening of the throttle exceeds the given value or when the vehicle speed is not an allowable vehicle speed, that is, the usual traveling state is estimated, the throttle control flag continues the "inhibited" state so that the driver does not receive the push-walk control.

Once the driver 103 assumes the push-walk allowable state, the determination of the opening of the throttle (THRA) and the determination of the push-walk speed flag (FWLKV) are not performed and the push-walk control is continued. However, when the push-walk switch 35a suffers from trouble or is removed, the push-walk control flag is set to the "inhibited." Thus, the driver 103 stops the push-walk control.

Figure 14:
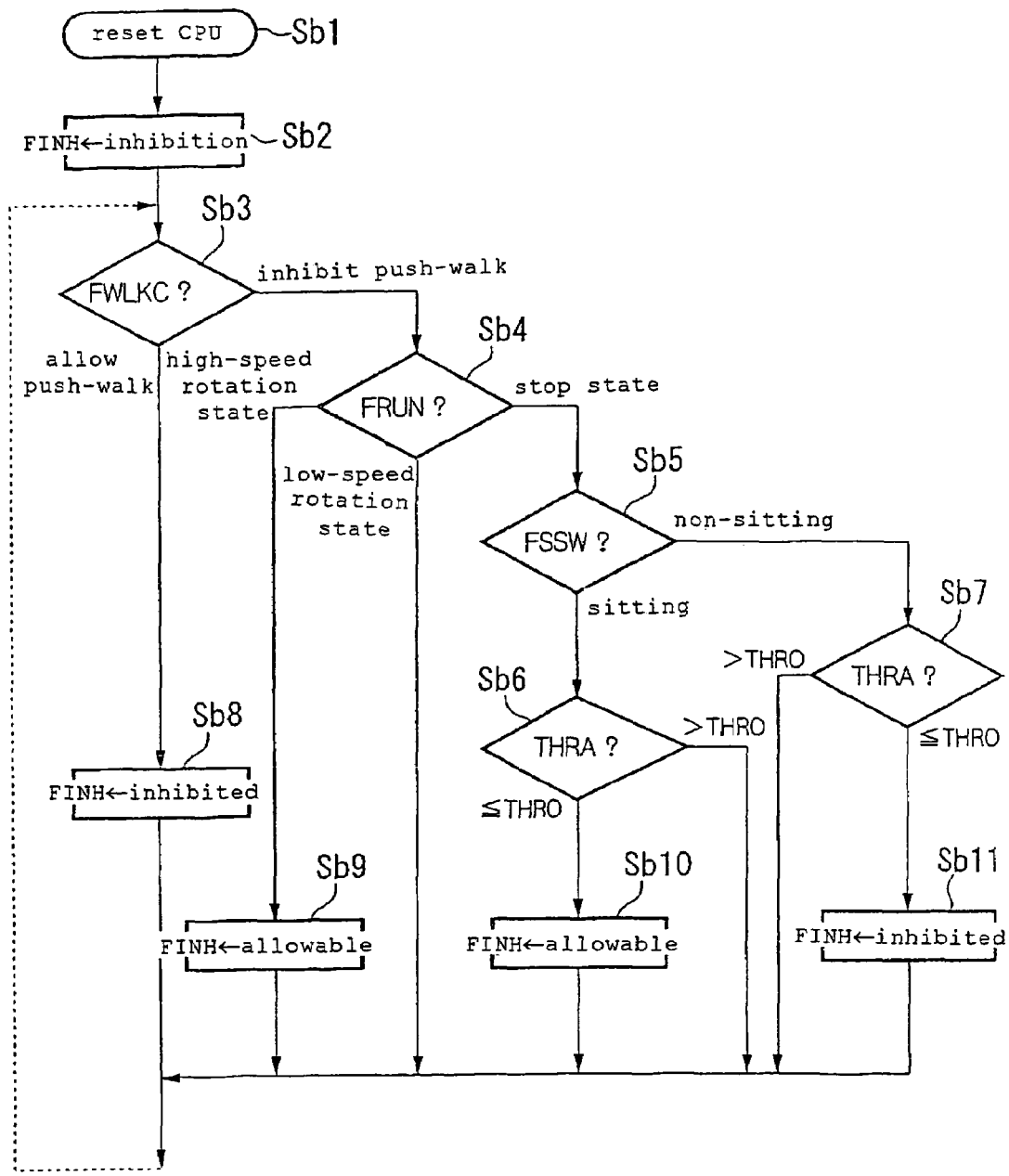
FIG. 14 is a flow chart of a throttle control according to the present invention.

FIG. 14 is a flowchart including an explanation of the processing with respect to the control which does not sense the opening of the throttle and the vehicle speed when the driver 103 assumes the push-walk allowable state described in FIG. 13 and the determination whether the throttle control is performed or not in response to the sitting/non-sitting state of the seat. A symbol FINH in the drawing is a flag which indicates a throttle traveling control flag, wherein when the throttle traveling control flag is set to the "allowable," the throttle traveling is allowed and when the throttle traveling control flag indicates the "inhibited," the throttle traveling is not performed. A symbol FSSW indicates a seat condition flag which shows the sitting state and the non-sitting state of the seat. The sitting/non-sitting states of the seat are also always detected from the seat switch input port 103f of the driver 103. Since other flags are equal to the flags which are used in FIG. 13, the explanation thereof is omitted.

First of all, the main switch 42 is started up and the CPU of the driver 103 is reset (step Sb1). Thus, the throttle traveling control flag is set to the "inhibited" (step Sb2). Next, the state of the push-walk control flag (FWLKC) is determined (step Sb3). When the push-walk control flag is set to the "allowable," the throttle traveling control flag is set to the "inhibited" and the throttle control is longer performed (step Sb8). When the push-walk control flag is set to the "inhibited," the processing advances to the determination processing of the traveling speed flag (FRUN) (step Sb4). The traveling speed flag is set to any one of the stop state, the low-speed rotation state and the high-speed rotation speed depending on the state transition explained in conjunction with FIG. 11, wherein when the traveling speed flag assumes the high-speed rotation state in the determination of the traveling speed flag (step Sb4), the throttle control flag is set to the "allowable" (step Sb9). Thus, the throttle control can be performed. When the traveling speed flag assumes the low-speed rotation state, the preceding state is continued. When the traveling speed flag assumes the stop state, the processing advances to the next determination of the sitting condition of the seat (step Sb5). The sitting or the non-sitting state is set in the seat state flag (FSSW) and this state is determined. When the sitting is set in the seat condition flag (FSSW), the processing advances to the determination processing of the opening of the throttle (THRA) (step Sb6). In the determination processing of the opening of the throttle (step Sb6), when the opening of the throttle is not more than the given value (THRO), the "allowable" is set in the throttle traveling control flag. Thus, the throttle control can be performed. When the opening of the throttle exceeds the given value (THRO), this state is continued. Next, when the seat condition flag is set to the non-sitting, the processing advances to the determination processing of the opening of the throttle (step Sb7). In the determination processing of the opening of the throttle (step Sb7), when the opening of the throttle is not more than the given value (THRO), the "inhibited" is set in the throttle traveling control flag, while when the opening of the throttle exceeds the given value (THRO), this state is continued. That is, to arrange the controls depending on the seat state, the throttle control can be performed only when the sitting is performed during the stop state and the throttle is substantially fully closed and when the rider leaves the seat during the stop, the throttle control is stopped.

The driver 103 continuously monitors the states of the respective flags and performs the control based on the throttle traveling when the throttle control flag is set to the "allowable" in other control parts. The driver 103, when the throttle control flag is set to the "inhibited" and the push-walk control flag is set to the "allowable," stops the reception of the control based on the throttle traveling, starts up the push-walk control, and drives the motor 100 at the given speed (for example, approximately 5 km/sec).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrically-driven vehicle comprising:
an electrically-driven motor for driving a drive wheel;
a battery for supplying electric power to the electrically-driven motor;
a throttle for adjusting a vehicle speed;
a control part for controlling the electrically-driven motor based on an output of the throttle, the electrically-driven vehicle including:
push-walk switch means for allowing a rider to instruct push-walk traveling; and
vehicle state detection means for detecting a state of the vehicle;
wherein the control part controls the electrically-driven motor in the push-walk traveling only when the control part receives an instruction from the push-walk switch means and the vehicle state which is detected by the vehicle state detection means satisfies a preset condition.

2. The electrically-driven vehicle according to claim 1, wherein the control part does not perform a control based on the output of the throttle during the exercise of the push-walk traveling.

3. The electrically-driven vehicle according to claim 1, wherein the preset condition is an opening of the throttle not larger than a fixed value.

4. The electrically-driven vehicle according to claim 2, wherein the preset condition is an opening of the throttle not larger than a fixed value.

5. The electrically-driven vehicle according to claim 1, wherein the preset condition is the vehicle speed not larger than a fixed value.

6. The electrically-driven vehicle according to claim 2, wherein the preset condition is the vehicle speed not larger than a fixed value.

7. The electrically-driven vehicle according to claim 1, wherein the control part does not receive the instruction from the push-walk switch means when the vehicle speed exceeds a fixed value.

8. The electrically-driven vehicle according to claim 2, wherein the control part does not receive the instruction from the push-walk switch means when the vehicle speed exceeds a fixed value.

9. The electrically-driven vehicle according to claim 3, wherein the control part does not receive the instruction from the push-walk switch means when the vehicle speed exceeds the fixed value.

10. The electrically-driven vehicle according to claim 5, wherein the control part does not receive the instruction from the push-walk switch means when the vehicle speed exceeds the fixed value.

11. A control system for an electrically-driven vehicle having an electrically-driven motor for driving a drive wheel and a throttle for adjusting a vehicle speed comprising:
a controller for controlling the electrically-driven motor based on an output of the throttle;

a push-walk switch for allowing a rider to select push-walk traveling; and a vehicle state detector for detecting a state of the vehicle;

wherein the controller controls the electrically-driven motor in the push-walk traveling only when the controller receives an instruction from the push-walk switch and the vehicle state is detected by the vehicle state detector satisfies a preset condition.

12. The control system for an electrically-driven vehicle according to claim 11, wherein the controller does not perform a control based on the output of the throttle during the exercise of the push-walk traveling.

13. The control system for an electrically-driven vehicle according to claim 11, wherein the preset condition is an opening of the throttle not larger than a fixed value.

14. The control system for an electrically-driven vehicle according to claim 12, wherein the preset condition is an opening of the throttle not larger than a fixed value.

15. The control system for an electrically-driven vehicle according to claim 11, wherein the preset condition is the vehicle speed not larger than a fixed value.

16. The control system for an electrically-driven vehicle according to claim 12, wherein the preset condition is the vehicle speed not larger than a fixed value.

17. The control system for an electrically-driven vehicle according to claim 11, wherein the controller does not receive the instruction from the push-walk switch when the vehicle speed exceeds a fixed value.

18. The control system for an electrically-driven vehicle according to claim 12, wherein the controller does not receive the instruction from the push-walk switch when the vehicle speed exceeds a fixed value.

19. The control system for an electrically-driven vehicle according to claim 13, wherein the controller does not receive the instruction from the push-walk switch when the vehicle speed exceeds the fixed value.

20. The control system for an electrically-driven vehicle according to claim 15, wherein the controller does not receive the instruction from the push-walk switch when the vehicle speed exceeds the fixed value.

* * * * *